(12) United States Patent
Koziy et al.

(10) Patent No.: US 8,312,237 B2
(45) Date of Patent: Nov. 13, 2012

(54) AUTOMATED RELOCATION OF IN-USE MULTI-SITE PROTECTED DATA STORAGE

(75) Inventors: Leila Koziy, Braintree, MA (US); Thomas M. Palumbo, Sutton, MA (US)

(73) Assignee: Autonomy, Inc., San Francisco, CA (US)

( * ) Notice: Subject to any disclaimer, the term of this patent is extended or adjusted under 35 U.S.C. 154(b) by 379 days.

(21) Appl. No.: 12/789,166

(22) Filed: May 27, 2010

(65) Prior Publication Data
US 2011/0246424 A1 Oct. 6, 2011

Related U.S. Application Data

(60) Provisional application No. 61/320,501, filed on Apr. 2, 2010.

(51) Int. Cl.
*G06F 12/00* (2006.01)
(52) U.S. Cl. ........................................................ 711/162
(58) Field of Classification Search ......................... None
See application file for complete search history.

(56) References Cited

U.S. PATENT DOCUMENTS

| | | |
|---|---|---|
| 7,627,617 B2 | 12/2009 | Kavuri et al. |
| 2002/0055972 A1 | 5/2002 | Weinman, Jr. |
| 2007/0022121 A1 | 1/2007 | Bahar et al. |
| 2007/0233828 A1 | 10/2007 | Gilbert |
| 2008/0147821 A1 | 6/2008 | Dietrich et al. |
| 2009/0254572 A1 | 10/2009 | Redlich et al. |
| 2009/0271412 A1 | 10/2009 | Lacapra et al. |
| 2009/0288084 A1 | 11/2009 | Astete et al. |
| 2010/0064166 A1 | 3/2010 | Dubnicki et al. |

FOREIGN PATENT DOCUMENTS

| | | |
|---|---|---|
| EP | 1522926 A2 | 4/2005 |
| WO | 2008151881 A1 | 12/2008 |

*Primary Examiner* — Brian Peugh (57) ABSTRACT

Methods of providing access to data are presented. The method includes providing a storage grid which includes a source chain of storage nodes and a target chain of storage nodes, the source chain including a primary source node and a secondary source node which operates as a data mirror of the primary source node, and the target chain including a primary target node and a secondary target node which operates as a data mirror of the primary target node. The method also includes initially storing data on the source chain, the primary source node of the source chain maintaining a primary source copy of the data, and the secondary source node of the source chain maintaining a secondary source copy of the data. The method further includes relocating the data from the source chain to the target chain, the primary target node of the target chain maintaining a primary target copy of the data, and the secondary target node of the target chain maintaining a secondary target copy of the data, access to the data being continuously provided from the storage grid to an external device before, during, and after relocation of the data from the source chain to the target chain.

20 Claims, 8 Drawing Sheets

AUTOMATED RELOCATION OF IN-USE MULTI-SITE PROTECTED DATA STORAGE

CROSS REFERENCE TO RELATED APPLICATIONS

This Patent Application is a Utility Application claiming the benefit of U.S. Provisional Application No. 61/320,501 filed on Apr. 2, 2010, entitled, "AUTOMATED RELOCATION OF IN-USE MULTI-SITE PROTECTED DATA STORAGE", the contents and teachings of which are hereby incorporated by reference in their entirety.

BACKGROUND

In general, a policy refers to a collection of disk files to be protected. Other information may be considered as belonging to the policy (e.g., location of the files, backup parameters, user specified metadata, a duration for which the data should be protected, a route to which the protected data should be sent etc.). However, for the purposes of this document, it should be understood that the term "policy" simply refers to a set of files (i.e., protected data). Accordingly, policy changes are changes to the protected data.

A server data protection product backs up protected data of a policy over the internet to a (computer) vault at a remote site and then replicates the protected data of that policy to a second (computer) vault at a geographically separate site. These vaults are configured in pairs, with one vault at each remote site. The server is considered protected in that the protected data of the backed up policy can be restored from either vault.

SUMMARY

One of the problems inherent in such data access systems is availability. The system and data are available at all times during normal operations as well as during a specialized operation such as a move policy operation that is needed when a problem with the vault capacity is detected.

In addition, the size of the data to be protected may be unpredictable. Those operating the data access system typically don't know the amount of data being protected by a given policy. Even in best-case scenarios, the size of the data on a server containing data to be protected may grow substantially over time. In addition, there can be significant differences between the size of the protected data and the size of the actual data stored on the backend vaults, due to the compression and encryption preformed on every disk block of protected data. For these reasons, vault pairs at the remote storage sites can become overused or even underused. Overuse may cause a vault pair to fill up more than the maximum desired operating range, thereby causing possible performance degradation. Underuse results in an inefficient use of resources and raises the total storage cost expenses.

To address this problem, a method of providing access to data is presented as an embodiment of a solution to the stated problem. The method includes providing a storage grid which includes a source chain of storage nodes and a target chain of storage nodes, the source chain including a primary source node and a secondary source node which operates as a data mirror of the primary source node, and the target chain including a primary target node and a secondary target node which operates as a data mirror of the primary target node. The method also includes initially storing data on the source chain, the primary source node of the source chain maintaining a primary source copy of the data, and the secondary source node of the source chain maintaining a secondary source copy of the data. The method further includes relocating the data from the source chain to the target chain, the primary target node of the target chain maintaining a primary target copy of the data, and the secondary target node of the target chain maintaining a secondary target copy of the data, access to the data being continuously provided from the storage grid to an external device before, during, and after relocation of the data from the source chain to the target chain.

Implementations are directed toward the following.

The primary source node and the primary target node can reside at a first location, wherein the secondary source node and the secondary target node can reside at a second location which is different than and remote from the first location, and wherein relocating the data from the source chain to the target chain can include deleting the data from the source chain after the primary target node of the target chain maintains the primary target copy of the data, and the secondary target node of the target chain maintains the secondary target copy of the data.

Further, the external device can be a server which stores a policy, and initially storing the data on the source chain can include making, as the primary source copy of the data maintained by the primary source node, a first backup of the policy stored on the server, and making, as the secondary source copy of the data maintained by the secondary source node, a second backup of the policy stored on the server. Still further, relocating the data from the source chain to the target chain can include making, as the primary target copy of the data maintained by the primary target node, a first backup of the policy stored on the server, and making, as the secondary target copy of the data maintained by the secondary target node, a second backup of the policy stored on the server.

Relocating the data from the source chain to the target chain can include replicating the primary source copy of the data maintained by the primary source node to the primary target node to form the primary target copy of the data maintained by the primary target node, and replicating the secondary source copy of the data maintained by the secondary source node to the secondary target node to form the secondary target copy of the data maintained by the secondary target node Further, the external device can be a server which stores a policy, and the method can further include, during relocation of the data from the source chain to the target chain, at the primary source node, receiving a policy change from the server and updating the primary source copy of the data maintained by the primary source node with the policy change received from the server, at the primary target node, receiving the policy change from the primary source node and updating the primary target copy of the data maintained by the primary target node with the policy change received from the primary source node, at the secondary source node, receiving the policy change from the primary target node and updating the secondary source copy of the data maintained by the secondary source node with the policy change received from the primary target node, and at the secondary target target node, receiving the policy change from the secondary source node and updating the secondary target copy of the data maintained by the secondary target node with the policy change received from the secondary source node.

Also, a chain database can be constructed and arranged to store chain entries, each chain entry of the chain database defining a chain of storage nodes, wherein a source chain entry of the chain database can define the source chain, and wherein updating the secondary source copy of the data maintained by the secondary source node with the policy changes received from the primary source node can include sending, based on the source chain entry, the policy changes from the primary source node to the secondary source node through a computerized public network which spans the first and second locations. Further, a target chain entry of the chain database can define the target chain, wherein updating the secondary target copy of the data maintained by the secondary target node with the further policy changes received from the primary target node can include sending, based on the target chain entry, the further policy changes from the primary target node to the secondary target node through the computerized public network which spans the first and second locations, the target chain entry being different than the source chain entry.

The method can also include storing a temporary chain entry in the chain database, the temporary chain entry defining a temporary chain which is different than each of the source chain and the target chain, and including (i) the primary source node, (ii) the primary target node, (iii) the secondary source node, and (iv) the secondary target node, arranged in series. Also, a chain database can be constructed and arranged to store chain entries, each chain entry of the chain database defining a chain of storage nodes.

Further, the method can include, prior to relocating the data from the source chain to the target chain, at the primary source node, periodically receiving policy changes from the server and updating the primary source copy of the data maintained by the primary source node with the policy changes received from the server, and at the secondary source node, periodically receiving the policy changes from the primary source node and updating the secondary source copy of the data maintained by the secondary source node with the with the policy changes received from the primary source node.

Further, the method can include, after relocating the data from the source chain to the target chain, at the primary target node, periodically receiving further policy changes from the server and updating the primary target copy of the data maintained by the primary target node with the further policy changes received from the server, and at the secondary target node, periodically receiving the further policy changes from the primary target node and updating the secondary target copy of the data maintained by the secondary target node with the further policy changes received from the primary target node.

The method can further include performing a restoration operation which restores at least a portion of the policy from the data on the source chain back to the server. The method can still further include performing a restoration operation which restores at least a portion of the policy from the data relocated from the source chain to the target chain back to the server.

A further embodiment of the solution to the stated problem is a system to provide access to data. The system includes a storage grid having a source chain of storage nodes and a target chain of storage nodes, the source chain including a primary source node and a secondary source node which operates as a data mirror of the primary source node, and the target chain including a primary target node and a secondary target node which operates as a data mirror of the primary target node. The system also includes a relocation circuit coupled to the source chain of storage nodes and the target chain of storage nodes, the relocation circuit being constructed and arranged to direct initial storage of data on the source chain, the primary source node of the source chain maintaining a primary source copy of the data, and the secondary source node of the source chain maintaining a secondary source copy of the data, and direct relocation of the data from the source chain to the target chain, the primary target node of the target chain maintaining a primary target copy of the data, and the secondary target node of the target chain maintaining a secondary target copy of the data, access to the data being continuously provided from the storage grid to an external device before, during, and after relocation of the data from the source after relocation of the data from the source chain to the target chain.

Implementations are directed toward the following.

The primary source node and the primary target node can reside at a first location wherein the secondary source node and the secondary target node can reside at a second location which is different than and remote from the first location, and wherein the relocation circuit, when relocating the data from the source chain to the target chain, can be constructed and arranged to delete the data from the source chain after the primary target node of the target chain maintains the primary target copy of the data, and the secondary target node of the target chain maintains the secondary target copy of the data.

Further, the external device can be a server which stores a policy; and the relocation circuit, when directing initial storage of data on the source chain, can be constructed and arranged to make, as the primary source copy of the data maintained by the primary source node, a first backup of the policy stored on the server, and make, as the secondary source copy of the data maintained by the secondary source node, a second backup of the policy stored on the server.

A further embodiment of the solution to the stated problem is a computer program product having a non-transitory computer readable storage medium which stores code thereon, the code when executed by a computer causing the computer to provide access to data, the code including instructions to direct operation of a storage grid which includes a source chain of storage nodes and a target chain of storage nodes, the source chain including a primary source node and a secondary source node which operates as a data mirror of the primary source node, and the target chain including a primary target node and a secondary target node which operates as a data mirror of the primary target node. The code also include instructions to direct initial storage of the data on the source chain, the primary source node of the source chain maintaining a primary source copy of the data, and the secondary source node of the source chain maintaining a secondary source copy of the data. The code further includes instructions to direct relocation of the data from the source chain to the target chain, the primary target node of the target chain maintaining a primary target copy of the data, and the secondary target node of the target chain maintaining a chain maintaining a secondary target copy of the data, access to the data being continuously provided from the storage grid to an external device before, during, and after relocation of the data from the source chain to the target chain.

Implementations are directed toward the following.

The primary source node and the primary target node can reside at a first location wherein the secondary source node and the secondary target node can reside at a second location which is different than and remote from the first location, and wherein the relocation circuit, when relocating the data from the source chain to the target chain, can be constructed and arranged to delete the data from the source chain after the primary target node of the target chain maintains the primary target copy of the data, and the secondary target node of the target chain maintains the secondary target copy of the data.

Further, the external device can be a server which stores a policy; and the relocation circuit, when directing initial storage of data on the source chain, can be constructed and arranged to make, as the primary source copy of the data maintained by the primary source node, a first backup of the policy stored on the server, and make, as the secondary source copy of the data maintained by the secondary source node, a second backup of the policy stored on the server.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views. The drawings are not necessarily to scale, emphasis instead being placed upon illustrating the principles of various embodiments of the invention.

DETAILED DESCRIPTION

An improved technique relocates data originating from an external device from a source chain of storage nodes in a storage grid to a target chain of storage nodes in the storage grid while providing access to the data from the storage grid to the external device before, during, and after the relocation of the data. Such relocation is capable of occurring transparently and without interruption to routine data access activities. As a result, policies (e.g., collections of files) can be moved among the storage nodes to make efficient and effective use of storage node resources.

The improved technique can apply to any storage service or product. For example, storage services such as full or partial restorations, backups, and replications benefit from the improved technique to be discussed in detail below.

Figure 1:
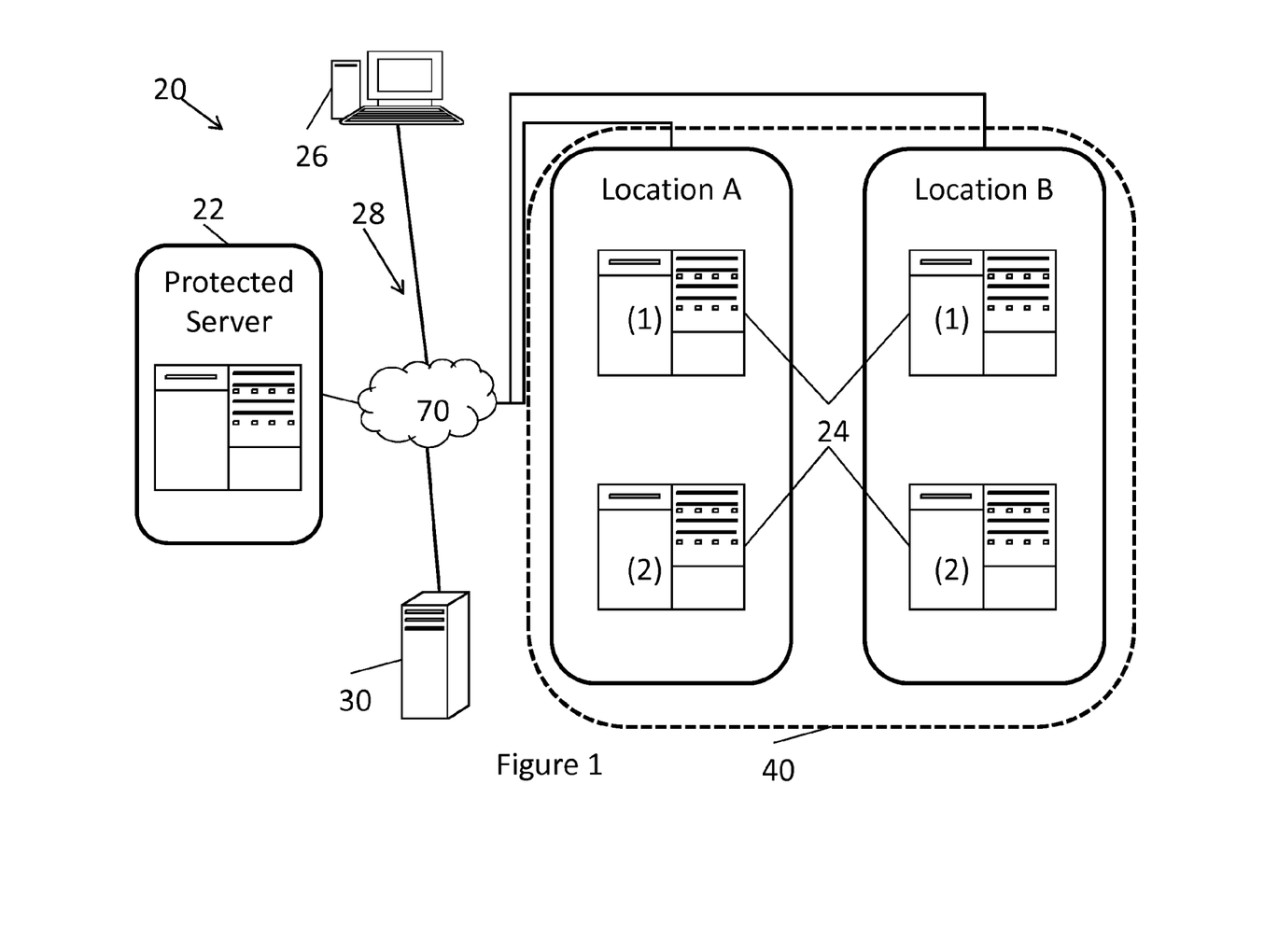
FIG. 1 is a block diagram of an electronic environment suitable for the improved technique of relocating data between source and target chains.

FIG. 1 shows an electronic environment 20 which is suitable for use by the improved technique. The electronic environment 20 includes a server 22, storage nodes 24, a relocation circuit 26, a communications medium 28, and a database system 30. The server 22 is connected to storage nodes 24 through communications medium 28. Server 22 typically resides in a location remote from any of the storage nodes.

The communications medium 28 conveys electronic communications 70 between the various components of the electronic environment 20. The communications medium 28 is illustrated as a cloud because it is capable of having a variety of topologies including hub-and-spoke, backbone, loop, irregular, a combination of the Internet and LAN(s), combinations thereof, and so on.

Storage nodes 24 (or "vaults") are storage platforms which include a front-end computer and a back-end storage device (e.g. a disk array (e.g., an array of magnetic disk drives) or SAN(Storage Area Network)). Individual storage nodes are labeled 24(i)(j), where i is an index representing a node location, and j an index representing a storage destination (e.g., whether the node is a source or target storage node). Different values of the node location index typically represent different locations remote from one another for improved disaster recovery purposes, e.g., a primary node in New York City, and a secondary node in Los Angeles.

Storage nodes 24 form a storage grid 40. In particular, the storage grid 40 includes a source chain 42 which includes a primary source node 24(A)(1) and a secondary source node 24(B)(1). The storage grid 40 further includes a target chain 44 which includes a primary target node 24(A)(2) and a secondary target node 24(B)(2). The primary source node 24(A)(1) and the primary target node 24(A)(2) reside at a first location A. Similarly, the secondary source node 24(B)(1) and the secondary target node 24(B)(2) reside at a second location B.

Figure 2:
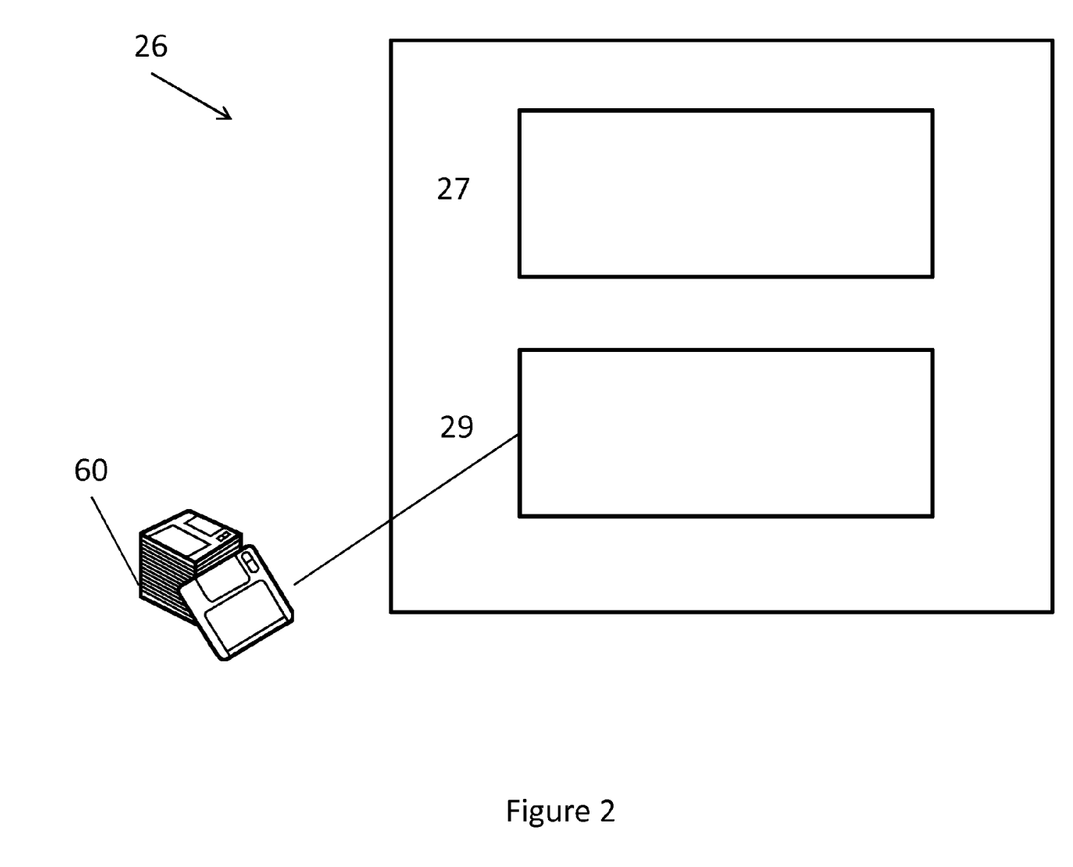
FIG. 2 is a block diagram of a relocation circuit.

Relocation circuit 26 is a specialized device which is constructed and arranged to perform the task of directing relocation of the backed up server data from a source chain to a target chain. The relocation occurs, for example, in response to a command from a user. As shown in FIG. 2, the relocation circuit 26 includes an electronic interface 27 and an electronic controller 29. In some arrangements, the electronic controller 29 includes a microprocessor and memory which are configured to receive a specialized application from a computer program product 60 through electronic interface 27. When the electronic controller 29 executes the specialized application, the relocation circuit 26 is equipped to robustly and reliably direct relocation activities among the storage nodes 24

Figure 3:
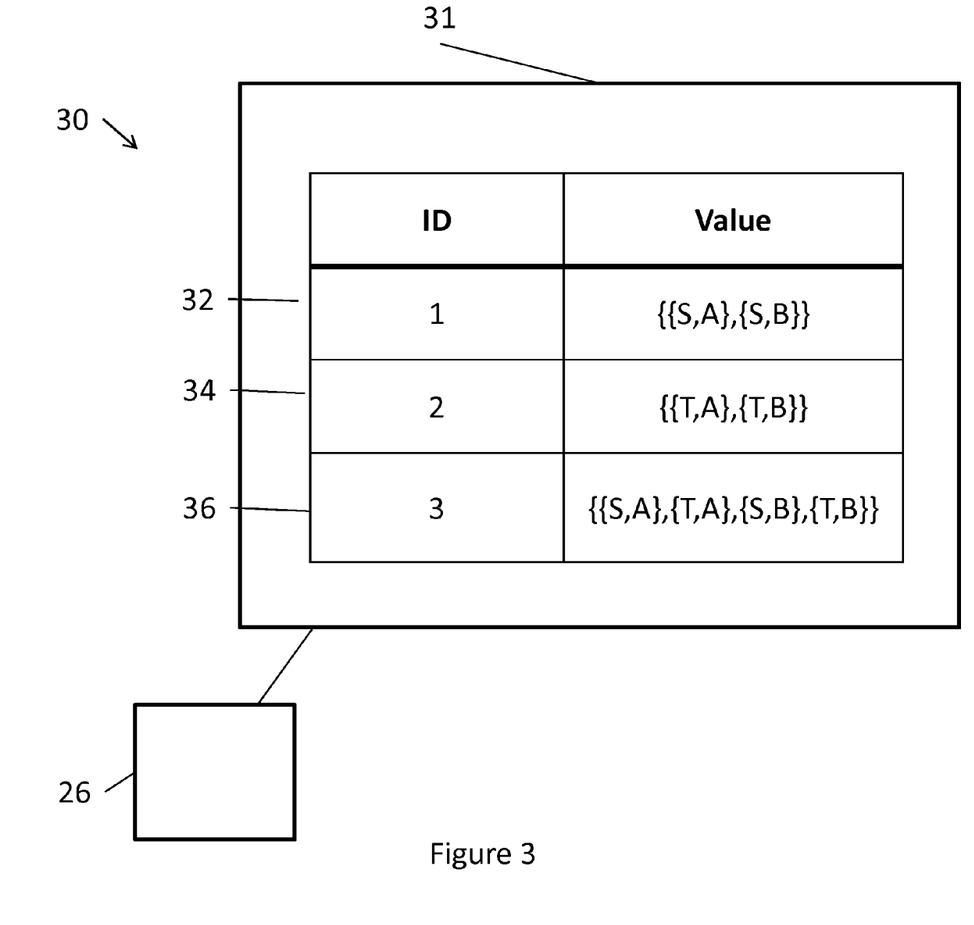
FIG. 3 is a block diagram of a chain database.

Database system 30 is a device configured to store information related to access paths involving the storage nodes 24. Access paths are also known as chains, and storage nodes are chained to provide storage redundancy, e.g., remote mirroring. For example, as illustrated in FIG. 3, database system 30, maintained by relocation circuit 26, stores a chain database 31. Chain database 31 is constructed and arranged to store chain entries, e.g., chain entries 32, 34 and 36. Each chain entry corresponds to an ID and a value. In the example illustrated in FIG. 3, a value field in a chain entry takes the form $\{\{c1,n1\},\{c2,n2\},\ldots,\{ci,nj\},\ldots\}$, where ci corresponds to value of an ID associated with a storage chain, nj corresponds to a value of an ID associated with a storage node within a storage chain. For the cases outlined below, ci takes the values S or T (source or target, respectively), and nj takes the values A or B. For example, in storage grid 40, primary source node 24(A)(1) is associated with the value field having value $\{S,A\}$, secondary source node 24(B)(1) is associated with the value field having value $\{S,B\}$, primary target node 24(A)(2) is associated with the value field having value $\{T,A\}$, and secondary target node 24(B)(2) is associated with the value field having value $\{T,B\}$.

Figure 4:
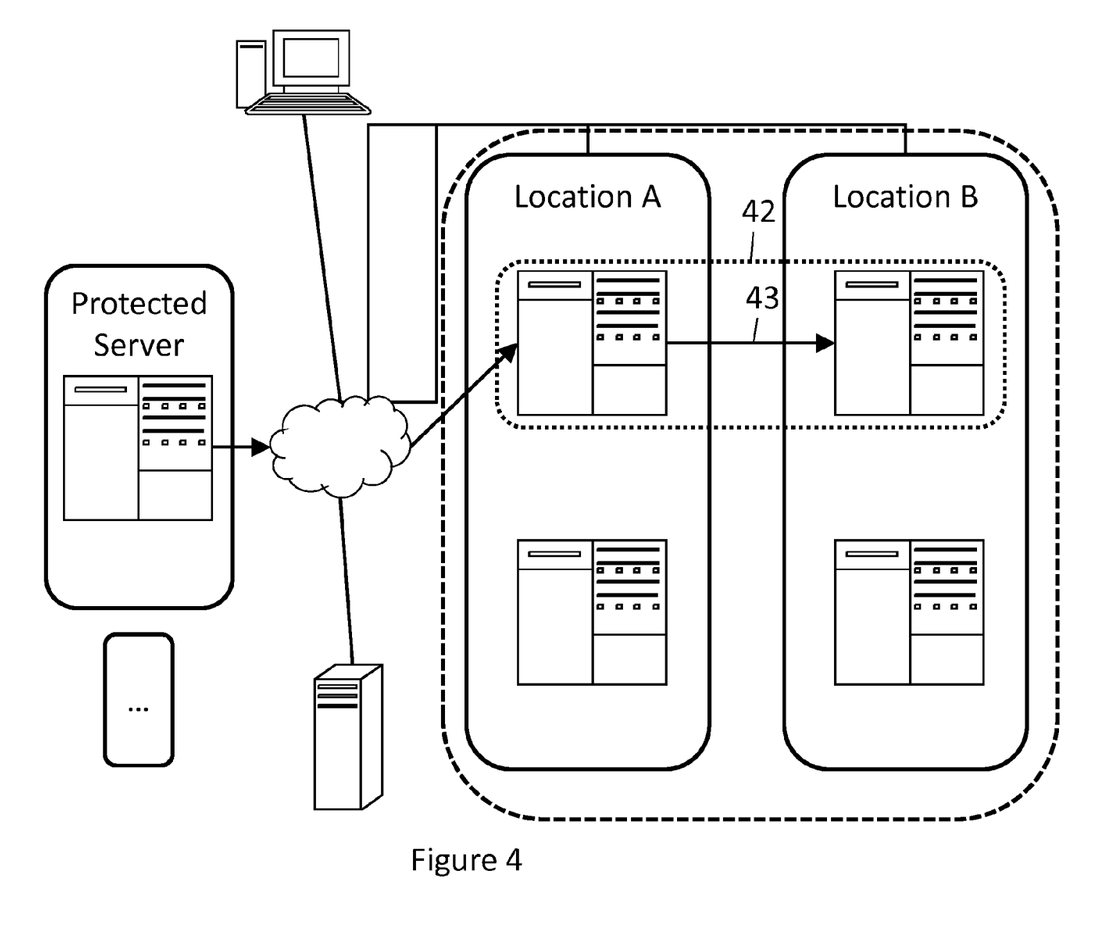
FIG. 4 is a block diagram of a movement of data within a source chain in the electronic environment.

Chain entry 32 in chain database 31, whose value field has value $\{\{S,A\},\{S,B\}\}$, defines a chain 42 which is illustrated in FIG. 4. In this case, only the storage nodes 24(A)(1) and 24(B)(1) are used, i.e., the storage nodes of source chain 42. The scenario described by chain database entry 32 represents, for example, a backup operation with data from server 22 being sent to primary source node 24(A)(1) and, during backup of the data, data now on primary source node 24(A)(1) being mirrored on secondary source node 24(B)(1).

Source chain 42 is also constructed and arranged to initially backup data from the server 22. Chain database entry 32 can represent the initial storing of data from server 22 onto source chain 42. Specifically, primary source node 24(A)(1) would maintain a primary source copy of the data from server 22, and secondary source node 24(B)(1) would maintain a secondary source copy of the data from server 22. For example, the primary source copy of the data would be a backup of a policy stored on server 22, and the secondary source copy of the data would be another backup of the policy.

Once data from server 22 has been initially stored onto source chain 42, source chain 42 can receive periodic policy changes from server 22. The primary source copy of the data maintained by primary source node 24(A)(1) is then updated with the policy changes received from server 22. The periodic policy changes would then be received at secondary source node 24(B)(1) from primary source node 24(A)(1), wherein the secondary source copy of the data maintained by secondary source node 24(B)(1) would be updated with the policy changes received from primary source node 24(A)(1). In updating the secondary source copy of the data with policy changes from primary source node 24(A)(1), the policy changes are sent from primary source node 24(A)(1) to secondary source node 24(B)(1) through a computerized public network 43 according to source chain entry 32. Computerized public network 43 is configured to span the node locations corresponding to primary source node 24(A)(1) and secondary source node 24(B)(1) and can take the form of, e.g., a high-bandwidth internet connection.

Figure 5:
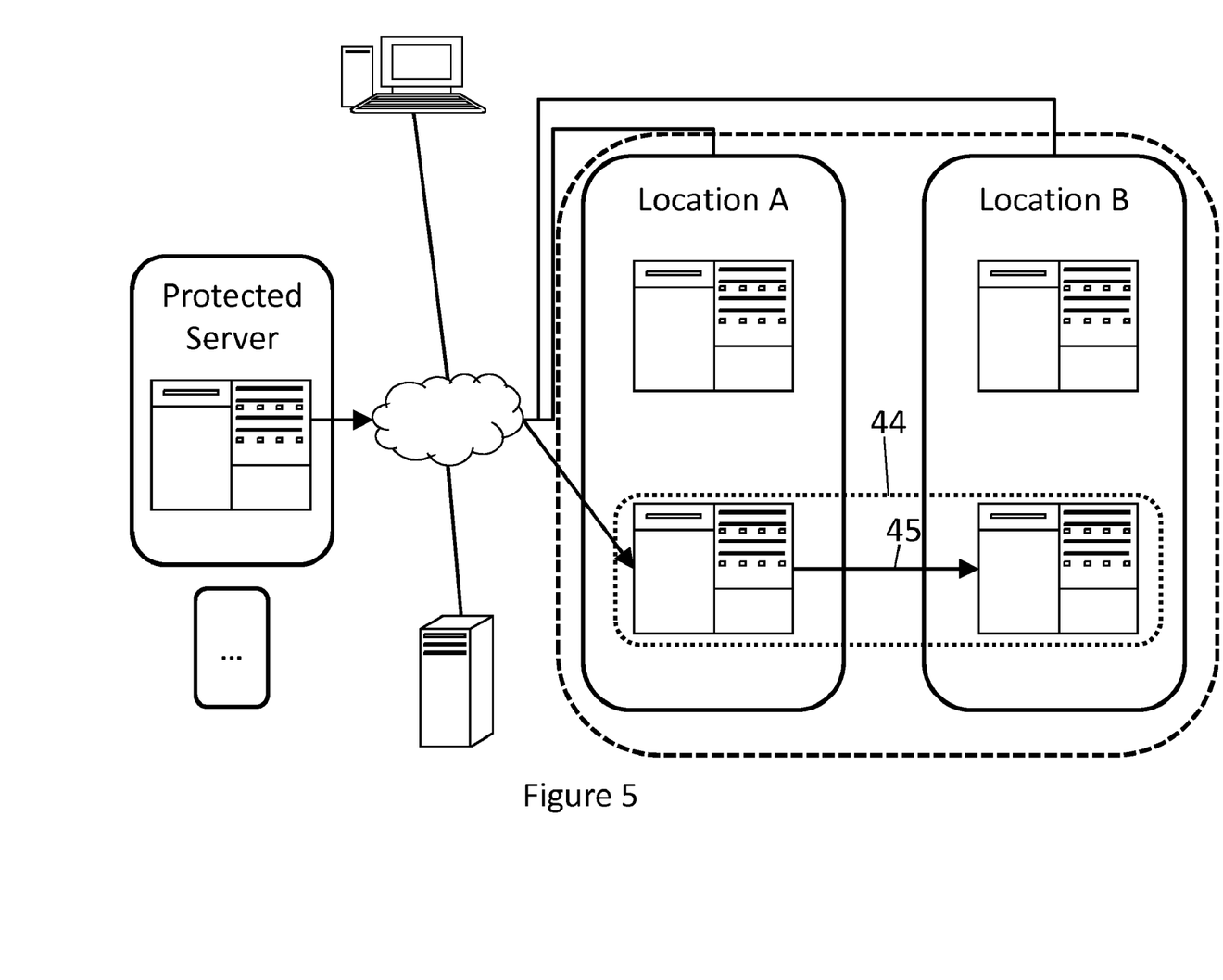
FIG. 5 is a block diagram of a movement of data within a target chain in the electronic environment.

Chain database 31 has further entries that give rise to other access paths. For example, chain entry 34 in chain database 31, whose value field has value {{T,A},{T,B}}, defines a chain 44 which is illustrated in FIG. 5. In this case, only the storage nodes 24(B)(1) and 24(B)(2) are used, i.e., the storage nodes of a target chain 44. The target chain 44 is constructed and arranged to subsequently backup data from the server 22 perhaps after a determination that the source chain 22 has reached a critical storage limit (e.g., exceeded a predetermined storage capacity threshold). The scenario described by chain database entry 34 represents, for example, a backup operation with data from server 22 being sent to primary target node 24(A)(2) and, during backup of the data, data now on primary target node 24(A)(2) being mirrored on secondary target node 24(B)(2). Specifically, primary target node 24(A)(2) would maintain a primary target copy of the data from server 22, and secondary target node 24(B)(2) would maintain a secondary target copy of the data from server 22. Such a scenario would take place, for example, after a relocation of the data from source chain 42 to target chain 44.

Once data from server 22 has been relocated from source chain 42 to target chain 44, target chain 44 can receive further periodic policy changes from server 22. The primary target copy of the data maintained by primary target node 24(A)(2) is then updated with the further policy changes received from server 22. The further periodic policy policy changes would then be received at secondary target node 24(B)(2) from primary target node 24(A)(2), wherein the secondary target copy of the data maintained by target source node 24(B)(2) would be updated with the further policy changes received from primary target node 24(A)(2). In updating the secondary target copy of the data with policy changes from primary target node 24(A)(2), relocation circuit 26 sends the policy changes from primary target node 24(A)(2) to secondary target node 24(B)(2) through a computerized public network 45 according to target chain entry 34. Computerized public network 45 is configured to span the node locations corresponding to primary target node 24(A)(2) and secondary target node 24(B)(2) and can take the form of, e.g., a high-bandwidth internet connection.

Figure 6:
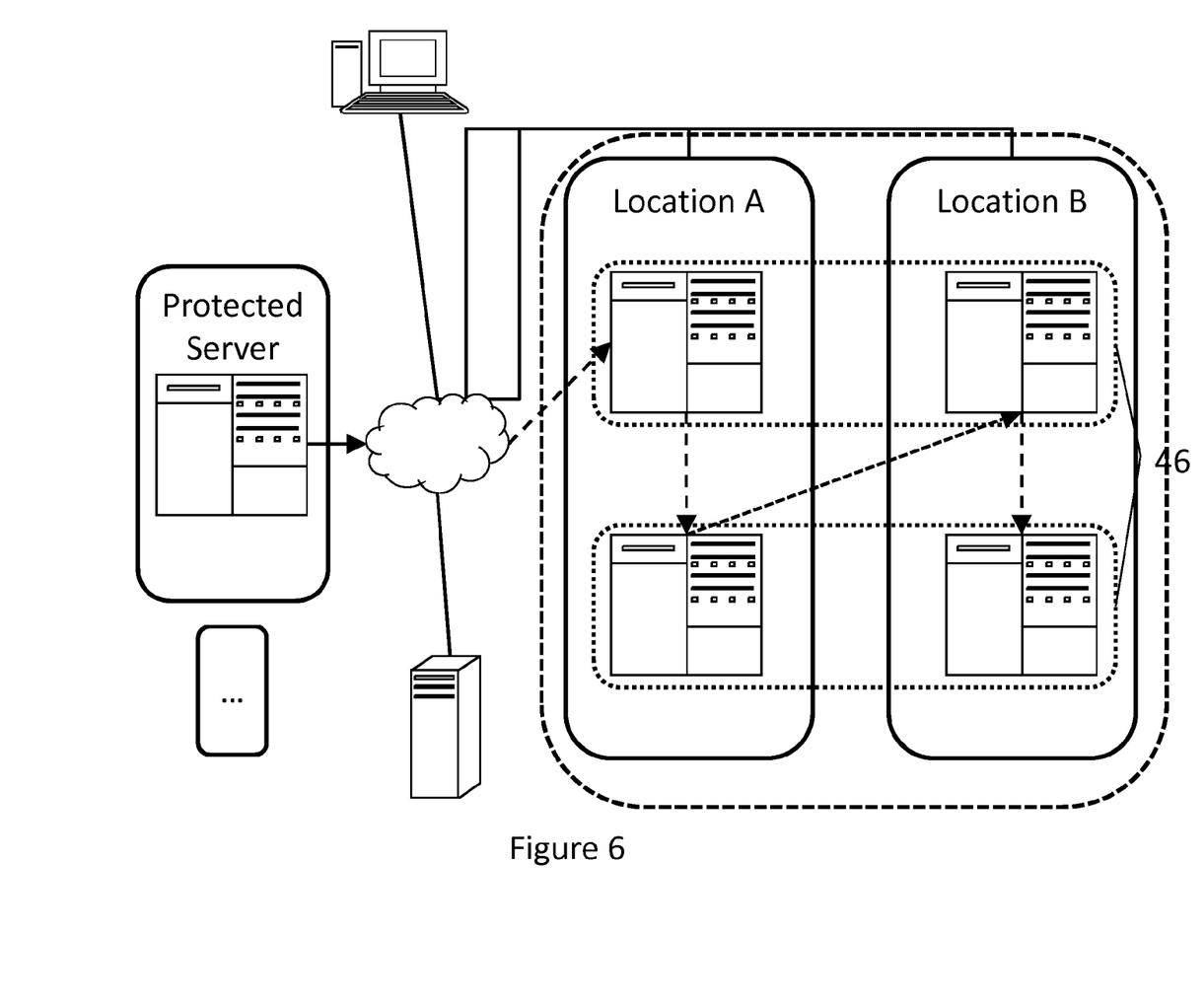
FIG. 6 is a block diagram of a relocation of data from the source chain to the target chain in the electronic environment.

The previous access paths illustrated in FIGS. 4 and 5, correspond to situations that can occur prior to, or after, a relocation operation. Of interest here is the formation of an access path during a restoration operation that allows for continuous access of data from, say, source chain 42 to server 22. Such an access path is represented by chain entry 36 in chain database 31. Chain entry 36 in chain database 31, with a value field having value {{S,A},{T,A},{S,B},{T,B}}, defines a temporary chain 46 which is illustrated in FIG. 6. The scenario described by temporary chain 46 represents, for example, a process of relocating data from server 22 from source chain 42 to target chain 44. In this sense, temporary chain 46 represents, e.g., an intermediate chain signifying a transition between chains 42 and 44. Further, data from the source chain can be deleted once the primary target node of the target chain maintains the primary target copy of the data and the secondary target node of the target chain maintains the secondary target copy of the data.

During operation of electronic environment 20, relocation circuit 26 communicates with storage nodes 24 to control and monitor the data relocation process (e.g., via electronic communications 70 through the communications medium 28). In particular, the relocation circuit 26 forms and operates temporary chain 46 to start a set of primary node replication operations to replicate backup versions from primary source node 24(A)(1) to primary target node 24(A)(2), forming the primary target copy of the data maintained by primary target node 24(A)(2). Likewise, the relocation circuit 26 operates temporary chain operates temporary chain 46 to start a set of secondary node replication operations to replicate backup versions from the secondary source node 24(B)(1) to the secondary target node 24(B)(2), forming the secondary target copy of the data maintained by secondary target node 24(B)(2). Additionally, the relocation circuit 26 can operate temporary chain 46 to temporarily backup data from the server while the primary node replication operations and the secondary node replication operations are ongoing.

The temporary chain 46 includes, in sequential order, the primary source node 24(A)(1), the primary target node 24(A)(2), the secondary source node 24(B)(1), and the secondary target node 24(B)(2). Relocation circuit 26 communicates with each of these nodes to establish temporary chain 46, through which policy changes traverse during relocation of data from server 22 within storage grid 40.

During relocation of data from source chain 42 to target chain 44, temporary chain 46 guides policy changes from server 22 throughout storage grid 40. Specifically, a policy change from server 22 is received at primary source node 24(A)(1) and, upon receipt, updates the primary source copy of the data maintained by primary source node 24(A)(1). The policy changes would then be received at primary target node 24(A)(2) from primary source node 24(A)(1), wherein the primary target copy of the data maintained by primary target node 24(A)(2) would be updated with the policy changes received from primary source node 24(A)(1). The policy changes would then be received at secondary source node 24(B)(1) from primary target node 24(A)(2), wherein the secondary source copy of the data maintained by secondary source node 24(B)(1) would be updated with the policy changes received from primary target node 24(A)(2). Finally, the policy changes would then be received at secondary target node 24(B)(2) from secondary source node 24(B)(1), wherein the secondary target copy of the data maintained by secondary target node 24(B)(2) would be updated with the policy changes received from secondary source node 24(B)(1).

An advantage of relocation circuit 26 operating temporary chain 46 to send data between primary source node 24(A)(1) and primary target node 24(A)(2), as well as between secondary source node 24(B)(1) and secondary target node 24(B)(2), is that data throughput is increased when using the intra-location networks of the electronic environment 20.

Relocation circuit 26, after the relocation process, can have a backup made of a policy stored on server 22 as the primary target copy of the policy maintained by primary target node 24(A)(2) and another backup made of the policy as the secondary target copy of the policy maintained by secondary target node 24(B)(2).

Figure 7:
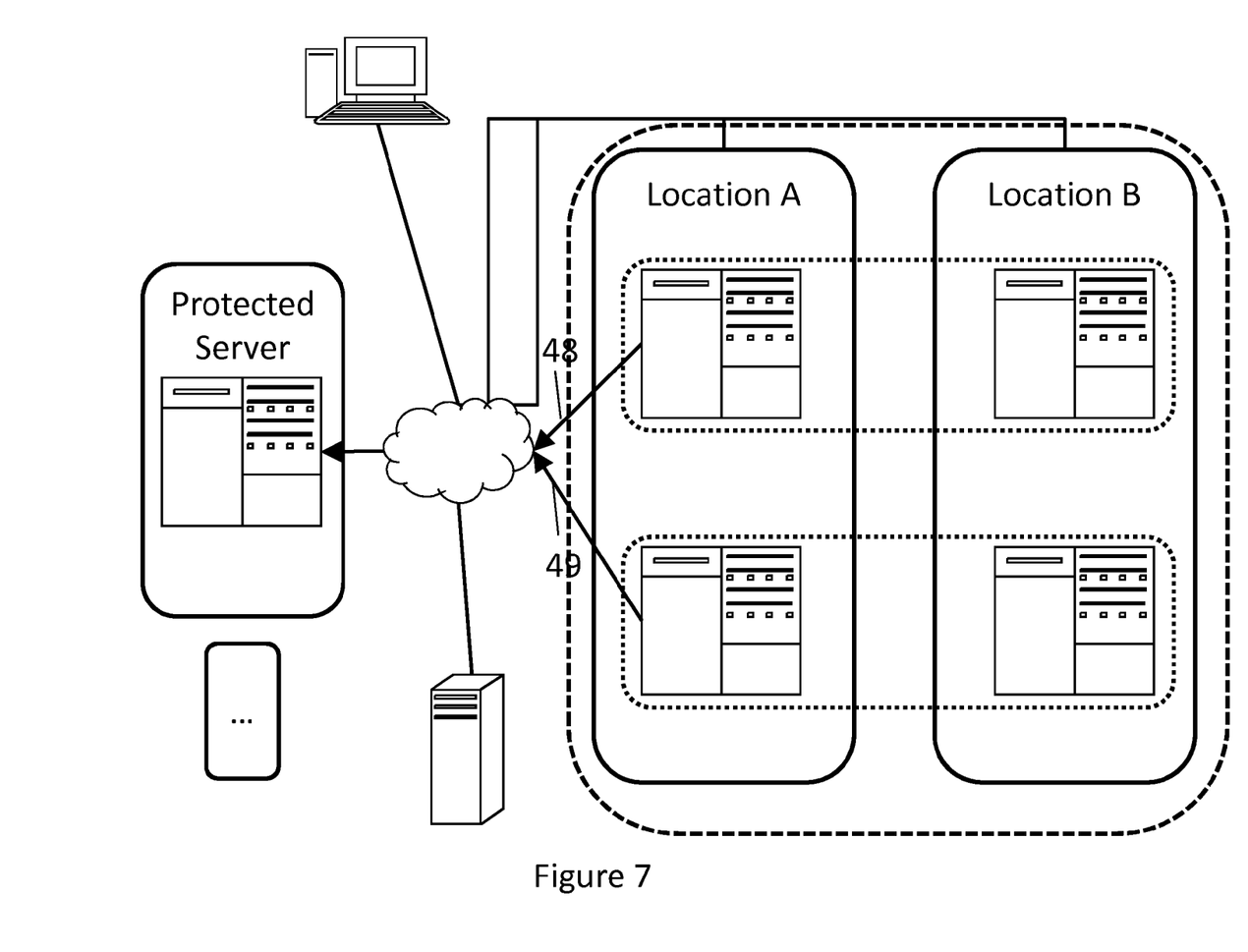
FIG. 7 is a block diagram of a restoration of data between source/target chains and a server.

It is desired to continuously provide access to policies stored on storage nodes within storage grid 40 back to server 22. Specifically, such access can take the form of a restoration operation and is illustrated in FIG. 7. The restoration operation occurs, for example, in response to a command from a user. Such a restoration operation restores, prior to a relocation operation, a portion of the policy specified by the user from data on source chain 42 back to server 22. Data on source chain 42 would originate from the initial storing of data or a subsequent backup. After a relocation operation, however, a restoration operation restores a portion of the policy specified by the user from data on target chain 44, relocated from source chain 42, back to server 22.

Figure 8:
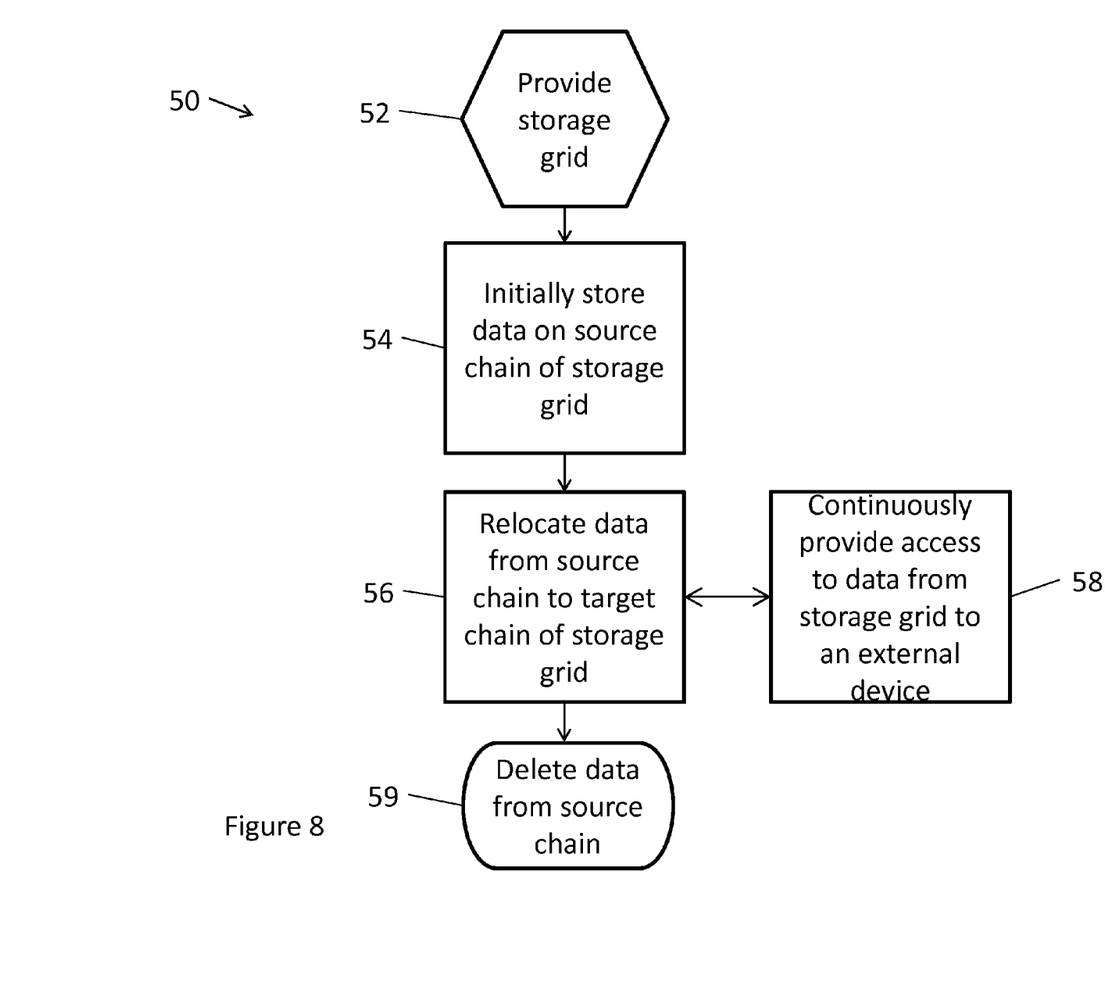
FIG. 8 is a flow chart illustrating the improved technique of relocating data between source and target chains.

A method 50 of providing access to data from an external device such as a server is illustrated in FIG. 8. A storage grid is defined 52 by a set of storage nodes in disparate locations. Data from the server is initially stored 54 on a source chain within the storage grid. Once this initial storage is accomplished, the data stored on the source chain is relocated 56 to a target chain within the storage grid. Before, during, and after this relocation, access to the data from storage grid to an external device is continuously provided 58.

The storage grid is defined 52 to include storage nodes which are chained to provide storage redundancy, e.g., remote mirroring. In particular, the storage grid includes a source chain which includes a primary source node and a secondary source node which operates as a data mirror of the primary source node. The storage grid further includes a target chain which includes a primary target node and a secondary target node which operates as a data mirror of the primary target node. The primary source node and the primary target node reside at a first location A. Similarly, the secondary source node and and the secondary target node reside at a second location B.

The initial storing 54 of data from the server onto the source grid is accomplished via a relocation circuit coupled to the source chain and target chain within the storage grid. The relocation circuit directs the primary source node to maintain a primary source copy of the data from the server, and the secondary source node to maintain a secondary source copy of the data from the server. For example, the primary source copy of the data would be a backup of a policy stored on the server, and the secondary source copy of the data would be another backup of the policy.

The data stored on the source chain is relocated 56 to a target chain within the storage grid. The relocation 56 is directed by the relocation circuit, which directs the primary target node of the target chain to maintain a primary target copy of the data and the secondary target node of the target chain to maintain a secondary target copy of the data.

The relocation circuit manages the relocation of the data in such a way that access to the data is continuously provided 58 from the storage grid to the server before, during, and after relocation 56 of the data from the storage chain to the target chain within the storage grid.

It should be understood that the above-described technique has generic applicability. Along these lines, the process is applicable to any product that has multiple copies of data, at repositories located within distinct remote sites. Such a product may even have a proprietary method for copying that data from one repository to another.

Advantageously, this new process defines a generic way to adapt any system's proprietary replication so it can be used to move remote data copies from their existing repositories to a new set of repositories, at the distinct remote sites. Importantly, during this move process, the product user does not lose any access to their data or experience any unavailability of product functionality. Such techniques effectively employ the temp route, how it is ordered and the attributes it has, as well as the two-phase completion processing, that ensures completion of the move at the earliest possible time, while maintaining the integrity and redundancy of the stored data at all times.

While various embodiments of the invention have been particularly shown and described, it will be understood by those skilled in the art that various changes in form and details may be made therein without departing from the spirit and scope of the invention as defined by the appended claims.

For example, it should be understood that the relocation circuit 26 may reside on a dedicated device. Alternatively, the relocation circuit 26 may form part of a server, a storage node, or another apparatus which performs other operations. In some arrangements, an agent 22 resides on the Internet, and storage grid 40 and the relocation circuit 26 reside within a secure private network.

Additionally, it should be understood that each storage node 24 is capable of backing up multiple policies stored on multiple protected servers 22. Similarly, each server 22 is capable of storing multiple policies which are backed up on one or more storage nodes 24.

Further, it is understood that, within a storage grid, there may be more than two chains, even though storage grids with two chains (source chain 42 and target chain 44) were discussed. Still further, within a chain, there can be more than two storage nodes, or vaults. Such a situation would correspond to a system with more than two disparate locations with vaults. Database chain entries in such situations would continue to be represented as described in FIG. 3.

Furthermore, it should be understood that some embodiments are directed to an electronic backup environment which relocates server data from a source chain 42 of storage nodes 24 to a target chain 44 of storage nodes 24. Some embodiments are directed to a storage provider infrastructure (e.g., a relocation circuit 26 in combination with a storage grid 40) which performs relocation. Some embodiments are directed to an apparatus or device which performs relocation. Some embodiments are directed to a process of performing relocation. Also, some embodiments are directed to a computer program product which enables computer logic to perform relocation.

Still further, it should be understood that, as a relocation circuit includes a controller having a processor and memory, relocation circuit 26 can be used to perform other functions. For example, relocation circuit 26 can be used to assign storage node locations for backing up a policy from a server.

In some arrangements, relocation circuit 26 is implemented by a set of processors or other types of control/processing circuitry running software. In such arrangements, the software instructions can be delivered to electronic controller 29 in the form of a computer program product 60 (illustrated generally by a diskette icon 60 in FIG. 2) having a computer readable storage medium which stores the instructions in a non-volatile manner. Examples of suitable computer readable storage media include tangible articles of manufacture and apparatus such as CD-ROM, flash memory, disk memory, tape memory, and the like.

What is claimed is:

1. A method of providing access to data, the method comprising:
   providing a storage grid which includes a source chain of storage nodes and a target chain of storage nodes, the source chain including a primary source node and a secondary source node which operates as a data mirror of the primary source node, and the target chain including a primary target node and a secondary target node which operates as a data mirror of the primary target node;
   initially storing data on the source chain, the primary source node of the source chain maintaining a primary source copy of the data, and the secondary source node of the source chain maintaining a secondary source copy of the data; and
   relocating the data from the source chain to the target chain, the primary target node of the target chain maintaining a primary target copy of the data, and the secondary target node of the target chain maintaining a secondary target copy of the data, access to the data being continuously provided from the storage grid to an external device before, during, and after relocation of the data from the source chain to the target chain.

2. A method as in claim 1 wherein the primary source node and the primary target node reside at a first location;
   wherein the secondary source node and the secondary target node reside at a second location which is different than and remote from the first location; and
   wherein relocating the data from the source chain to the target chain includes deleting the data from the source chain after (i) the primary target node of the target chain maintains the primary target copy of the data, and (ii) the secondary target node of the target chain maintains the secondary target copy of the data.

3. A method as in claim 2 wherein the external device is a server which stores a policy; and wherein initially storing the data on the source chain includes:
   making, as the primary source copy of the data maintained by the primary source node, a first backup of the policy stored on the server, and
   making, as the secondary source copy of the data maintained by the secondary source node, a second backup of the policy stored on the server.

4. A method as in claim 3, further comprising:
   performing a restoration operation which restores at least a portion of the policy from the data on the source chain back to the server.

5. A method as in claim 2 wherein the external device is a server which stores a policy; and wherein relocating the data from the source chain to the target chain includes:
   making, as the primary target copy of the data maintained by the primary target node, a first backup of the policy stored on the server, and
   making, as the secondary target copy of the data maintained by the secondary target node, a second backup of the policy stored on the server.

6. A method as in claim 5, further comprising:
   performing a restoration operation which restores at least a portion of the policy from the data relocated from the source chain to the target chain back to the server.

7. A method as in claim 2 wherein the external device is a server which stores a policy; and wherein the method further comprises, prior to relocating the data from the source chain to the target chain:
   at the primary source node, periodically receiving policy changes from the server and updating the primary source copy of the data maintained by the primary source node with the policy changes received from the server, and
   at the secondary source node, periodically receiving the policy changes from the primary source node and updating the secondary source copy of the data maintained by the secondary source node with the policy changes received from the primary source node.

8. A method as in claim 7, further comprising, after relocating the data from the source chain to the target chain:
   at the primary target node, periodically receiving further policy changes from the server and updating the primary target copy of the data maintained by the primary target node with the further policy changes received from the server, and
   at the secondary target node, periodically receiving the further policy changes from the primary target node and updating the secondary target copy of the data maintained by the secondary target node with the further policy changes received from the primary target node.

9. A method as in claim 8 wherein a chain database is constructed and arranged to store chain entries, each chain entry of the chain database defining a chain of storage nodes;
   wherein a source chain entry of the chain database defines the source chain;
   wherein updating the secondary source copy of the data maintained by the secondary source node with the policy changes received from the primary source node includes sending, based on the source chain entry, the policy changes from the primary source node to the secondary source node through a computerized public network which spans the first and second locations.

10. A method as in claim 9 wherein a target chain entry of the chain database defines the target chain; and
    wherein updating the secondary target copy of the data maintained by the secondary target node with the further policy changes received from the primary target node includes sending, based on the target chain entry, the further policy changes from the primary target node to the secondary target node through the computerized public network which spans the first and second locations, the target chain entry being different than the source chain entry.

11. A method as in claim 2 wherein relocating the data from the source chain to the target chain includes:
    replicating the primary source copy of the data maintained by the primary source node to the primary target node to form the primary target copy of the data maintained by the primary target node, and
    replicating the secondary source copy of the data maintained by the secondary source node to the secondary target node to form the secondary target copy of the data maintained by the secondary target node.

12. A method as in claim 11 wherein the external device is a server which stores a policy; and wherein the method further comprises, during relocation of the data from the source chain to the target chain:
    at the primary source node, receiving a policy change from the server and updating the primary source copy of the data maintained by the primary source node with the policy change received from the server,
    at the primary target node, receiving the policy change from the primary source node and updating the primary target copy of the data maintained by the primary target node with the policy change received from the primary source node,
    at the secondary source node, receiving the policy change from the primary target node and updating the secondary source copy of the data maintained by the secondary source node with the policy change received from the primary target node, and at the secondary target node, receiving the policy change from the secondary source node and updating the secondary target copy of the data maintained by the secondary target node with the policy change received from the secondary source node.

13. A method as in claim 12 wherein a chain database is constructed and arranged to store chain entries, each chain entry of the chain database defining a chain of storage nodes; and wherein the method further comprises:

storing a temporary chain entry in the chain database, the temporary chain entry defining a temporary chain which is different than each of the source chain and the target chain, and including (i) the primary source node, (ii) the primary target node, (iii) the secondary source node, and (iv) the secondary target node, arranged in series.

14. A method as in claim 13, further comprising:

communicating with each of (i) the primary source node, (ii) the primary target node, (iii) the secondary source node, and (iv) the secondary target node, to establish the temporary chain, the policy change traversing the storage grid in accordance with the established temporary chain during relocation of the data from the source chain to the target chain.

15. A system to provide access to data, the system comprising:

a storage grid having a source chain of storage nodes and a target chain of storage nodes, the source chain including a primary source node and a secondary source node which operates as a data mirror of the primary source node, and the target chain including a primary target node and a secondary target node which operates as a data mirror of the primary target node;

a relocation circuit coupled to the source chain of storage nodes and the target chain of storage nodes, the relocation circuit being constructed and arranged to:

direct initial storage of data on the source chain, the primary source node of the source chain maintaining a primary source copy of the data, and the secondary source node of the source chain maintaining a secondary source copy of the data, and direct relocation of the data from the source chain to the target chain, the primary target node of the target chain maintaining a primary target copy of the data, and the secondary target node of the target chain maintaining a secondary target copy of the data, access to the data being continuously provided from the storage grid to an external device before, during, and after relocation of the data from the source chain to the target chain.

16. A system as in claim 15 wherein the primary source node and the primary target node reside at a first location;

wherein the secondary source node and the secondary target node reside at a second location which is different than and remote from the first location; and wherein the relocation circuit, when relocating the data from the source chain to the target chain, is constructed and arranged to delete the data from the source chain after (i) the primary target node of the target chain maintains the primary target copy of the data, and (ii) the secondary target node of the target chain maintains the secondary target copy of the data.

17. A system as in claim 16 wherein the external device is a server which stores a policy; and wherein the relocation circuit, when directing initial storage of data on the source chain, is constructed and arranged to:

make, as the primary source copy of the data maintained by the primary source node, a first backup of the policy stored on the server, and make, as the secondary source copy of the data maintained by the secondary source node, a second backup of the policy stored on the server.

18. A computer program product having a non-transitory computer readable storage medium which stores code thereon, the code when executed by a computer causing the computer to provide access to data, the code including:

instructions to direct operation of a storage grid which includes a source chain of storage nodes and a target chain of storage nodes, the source chain including a primary source node and a secondary source node which operates as a data mirror of the primary source node, and the target chain including a primary target node and a secondary target node which operates as a data mirror of the primary target node;

instructions to direct initial storage of the data on the source chain, the primary source node of the source chain maintaining a primary source copy of the data, and the secondary source node of the source chain maintaining a secondary source copy of the data; and instructions to direct relocation of the data from the source chain to the target chain, the primary target node of the target chain maintaining a primary target copy of the data, and the secondary target node of the target chain maintaining a secondary target copy of the data, access to the data being continuously provided from the storage grid to an external device before, during, and after relocation of the data from the source chain to the target chain.

19. A computer program product as in claim 18 wherein the primary source node and the primary target node reside at a first location;

wherein the secondary source node and the secondary target node reside at a second location which is different than and remote from the first location; and wherein the instructions to direct relocation of the data from the source chain to the target chain include instructions to delete the data from the source chain after (i) the primary target node of the target chain maintains the primary target copy of the data, and (ii) the secondary target node of the target chain maintains the secondary target copy of the data.

20. A computer program product as in claim 19 wherein the external device is a server which stores a policy; and wherein the instructions to direct initial storage of the data on the source chain include:

instructions to make, as the primary source copy of the data maintained by the primary source node, a first backup of the policy stored on the server, and instructions to make, as the secondary source copy of the data maintained by the secondary source node, a second backup of the policy stored on the server.

* * * * *